Patented May 11, 1943

2,318,758

UNITED STATES PATENT OFFICE 2,318,758

ANTIOXIDANT

David Craig, Silver Lake, Ohio, assignor to The B. F. Goodrich Company, New York, N. Y., a corporation of New York No Drawing. Application September 22, 1942, Serial No. 459,287

17 Claims. (Cl. 260—809)

This invention relates to the preservation of organic materials which tend to deteriorate by absorption of oxygen from the air, and the means for preventing such deterioration.

It is well known that a large number of organic substances undergo a more or less severe deterioration in the presence of atmospheric oxygen. Among such substances are rubber, fatty oils, petroleum oils and their derivatives, soaps, aldehydes, synthetic resins, and the like. It has also been proposed to inhibit this deterioration by adding a small proportion of a phenol or aromatic base to the material which it is desired to protect.

I have now discovered a new class of antioxidants which are extremely effective in retarding the deterioration of rubber and also of other organic materials which deteriorate in the presence of oxygen or air. This new class of antioxidants consists of the reaction products of indene and secondary diaryl amines. The secondary diarylamines which may be used in making the desired reaction products comprise broadly compounds containing at least one secondary amino group and at least two aryl groups although other constituents may be present as for example additional secondary amino groups, additional aryl or substituted aryl groups, and the like.

In its preferred embodiment the present invention comprises the reaction products of indene and those secondary diarylamines which contain a secondary nitrogen atom linked directly to two different carbon atoms each of which is part of an aromatic ring, said aromatic ring being chosen from the benzene and naphthalene series. It is further preferred that the secondary diaryl amines employed in the preparation of the new class of antioxidants contain neither acidic nor primary amino groups. Among the diarylamines which may be reacted with indene to produce members of the preferred class of antioxidants are diphenylamine, phenyl-alpha-naphthylamine, phenyl-beta-naphthylamine, the phenyl tolylamines, phenyl butyl phenylamine, the ditolyl amines, di-alpha-naphthylamine, di-beta-naphthylamine, dibenzylamine, phenyl benzylamine, biphenyl phenylamine, dixenylamine, anilinotetraphenylmethane, dianilinodiphenylmethane, diphenyl p-phenylenediamine, p-phenoxy phenyl-beta-naphthylamine, di-beta-naphthyl-p-phenylenediamine, tolyl naphthylamine, p-hydroxydiphenylamine, anilino-biphenyleneoxide, anilino-acridine, 6-anilino-quinoline, p-chlorodiphenylamine, p-isopropoxydiphenylamine, and the equivalents and analogues of these compounds.

The reactions between indene and the secondary diarylamines are best carried out in the presence of a condensation catalyst as for example hydrochloric acid, hydrobromic acid, aluminum chloride, zinc chloride, stannic chloride, boron trifluoride, phosphoric acid, sulfuric acid, sodium bisulfate, ammonium bromide, iodine, etc., although other suitable catalysts may be employed where convenient or desirable. The alkylation may be carried out merely by mixing the indene and the diarylamine in the presence of the catalyst. Although it is often unnecessary to heat the mixture, the velocity of the reaction is, of course, greatly increased at higher temperatures. If desired, an inert organic solvent such as carbon disulfide may be used to facilitate the mixing of the reagents and the catalyst. Other proportions of reacting ingredients than those shown and other variations may be introduced without departing from the spirit of the present invention.

The chemical structure of the products obtained by reacting indene with secondary diarylamines is not known with certainty, but it is believed that the products have the structure indicated by the following formula

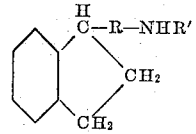

where R and R' are aryl groups. It is also possible that at least a part of the product has the structure shown by the formula

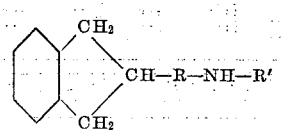

in which R and R' are aryl groups. However, the present invention is not limited by any assumption as to chemical structure, but pertains broadly to the products obtained by reacting indene with secondary diarylamines in the presence of a condensation catalyst.

I shall present specific examples of my invention in order more clearly to describe it.

Example I

A mixture of 338 parts by weight of diphenylamine and 68 parts of zinc chloride was heated to about 250° C. About 58 parts by weight of indene was added slowly to the mixture over a period of about two hours while maintaining the temperature of the latter at 250° to 265° C. and returning any vapors to the reaction vessel by means of a reflux condenser. The heating was continued for about 15 minutes after the addition of indene was completed. After cooling to room temperature, the oily liquid was separated from the solidified zinc chloride, washed twice with a boiling aqueous salt solution and once with hot water. The oil was then distilled at a pressure of 1½ mm. of mercury; unreacted diphenylamine and other materials distilled at temperatures up to 170° C.; the desired condensation product boiled at 170° to 240° C. and was found to be an antioxidant.

*Example II*

A mixture of about 169 parts by weight of diphenylamine, 58 parts of indene, and 13.5 parts of aluminum chloride was heated at 100° C. for about one hour. The oily material was then cooled, washed with 40 parts of water, and with 40 parts of a 25% aqueous sodium hydroxide solution. The addition of a small amount of benzene to the mixture facilitated the separation of the oil from the caustic solution. The oily material was then heated at a pressure of 1 mm., the material boiling off at temperatures up to 110° C. (head temperature) being discarded. The residue was found to be an antioxidant.

The materials made as described above were incorporated in the following rubber recipe, in which the parts are by weight:

|  | A | B | C |
|---|---|---|---|
| Rubber | 100.0 | 100.0 | 100.0 |
| Channel black | 50.0 | 50.0 | 50.0 |
| Zinc oxide | 5.0 | 5.0 | 5.0 |
| Stearic acid | 3.5 | 3.5 | 3.5 |
| Sulfur | 3.0 | 3.0 | 3.0 |
| Pine tar | 3.0 | 3.0 | 3.0 |
| Mercaptobenzothiazole | 1.0 | 1.0 | 1.0 |
| Product of Example I | | 2.0 | |
| Product of Example II | | | 2.0 |

The rubber compositions were vulcanized at 279° C., and the physical properties measured before and after aging, with the results as shown in the following table, where T is ultimate tensile strength in lb./sq. in. and E is ultimate elongation in percent.

| Cure time in minutes | A | | B | | C | |
|---|---|---|---|---|---|---|
|  | T | E | T | E | T | E |
| 30 | 3850 | 630 | 4000 | 680 | 3800 | 675 |
| 60 | 3940 | 555 | 4289 | 575 | 4050 | 610 |
| 90 | 3690 | 490 | 4245 | 590 | 4020 | 565 |

AFTER AGING 96 HOURS IN OXYGEN AT 300 LB./SQ. IN. AND 70° C.

| | | | | | | |
|---|---|---|---|---|---|---|
| 30 | 1150 | 425 | | | 2850 | 600 |
| 60 | 820 | 280 | 2777 | 490 | 2740 | 505 |
| 90 | 810 | 240 | | | 2510 | 460 |

Specimens of compositions A and C which had been cured 75 minutes at 279° C. were aged 14 days in a Geer oven and then flexed on a diMattia flexing machine at the rate of 300 flexures per minute at room temperature, using a one inch stroke. The condition of the samples after the indicated number of flexures is shown in the following table, each sample being rated on a scale of 10 (0=no cracks, 10=complete rupture).

| Flexures in thousands | Rating | |
|---|---|---|
|  | A | C |
| 100 | 2.7 | 0.5 |
| 200 | 5.7 | 1.0 |
| 300 | 7.0 | 1.0 |
| 1000 | Ruptured | 2.0 |
| 1500 | Ruptured | 2.5 |
| 2000 | Ruptured | 3.3 |
| 2500 | Ruptured | 5.5 |

The immense superiority which my new antioxidants confer on rubber compositions is apparent from the data presented above.

My new antioxidants may be effectively used in varying proportions, preferably from about 0.1 to about 5.0% by weight of the rubber compositions. Any of the usual pigments, fillers, reinforcing agents, accelerators, vulcanizing agents, softeners, and the like in common use in the rubber and plastics industry may be present in the rubber composition without destroying the effect of my antioxidants.

It is to be understood that the term "treating" as employed in the appended claims is used in a generic sense to include either the incorporating of the preferred class of materials into the rubber by milling or similar process, or their addition to the rubber latex before its coagulation, or the application thereof to the surface of a mass of crude or vulcanized rubber. The term "a rubber" is used in the appended claims to define a vulcanizable plastic material which possesses high extensibility under load coupled with the property of forcibly retracting to approximately its original size and shape after the load is removed. Such materials include, for example, india rubber, reclaimed rubber, balata, gutta percha, polychloroprene, and copolymers of butadiene with styrene, methyl acrylate, methyl methacrylate, or arcrylonitrile, and other natural or synthetic vulcanizable products which deteriorate upon aging whether or not admixed with fillers, pigments, or accelerating agents.

I claim:

1. The method of retarding the deterioration of an organic substance which tends to deteriorate by the absorption of oxygen from the air which comprises treating it with the product obtained by reacting indene with a secondary diarylamine containing only secondary amino groups in the presence of a condensation catalyst.

2. The method of preserving a rubber which comprises treating a rubber with a product obtained by reacting indene and a secondary diarylamine in which only secondary amino groups are present in the presence of a condensation catalyst.

3. The method of preserving a rubber which comprises treating a rubber with a product obtained by heating indene and a secondary diarylamine in which only secondary amino groups are present in the presence of a condensation catalyst.

4. The method of preserving a rubber which comprises treating a rubber with a product obtained by reacting indene and a secondary diarylamine in which only secondary amino groups are present and wherein a secondary nitrogen atom is linked directly to two different carbon atoms each of which is part of an aromatic ring in the presence of a condensation catalyst.

5. The method of preserving a rubber which comprises treating a rubber with a product obtained by associating indene and a secondary diarylamine in which only secondary amino groups are present and wherein a secondary nitrogen atom is linked directly to two different carbon atoms each of which is part of an aromatic ring, and effecting a reaction between the indene and said amine by heating in the presence of a condensation catalyst.

6. The method of preserving a rubber which comprises treating a rubber with a product obtained by reacting indene and a secondary diarylamine in which only secondary amino groups are present and wherein the aryl groups are chosen from the benzene and naphthalene series in the presence of a condensation catalyst.

7. The method of preserving a rubber which comprises treating a rubber with a product obtained by heating indene and a secondary diarylamine in which only secondary amino groups are present and wherein the aryl groups are chosen from the benzene and naphthalene series in the presence of a condensation catalyst.

8. The method of preserving india rubber which comprises treating india rubber with a product obtained by associating indene and a secondary diarylamine in which only secondary amino groups are present and wherein a secondary nitrogen atom is linked directly to two different carbon atoms each of which is a member of an aryl group chosen from the benzene and naphthalene series, and effecting a reaction between the indene and said amine by heating in the presence of a condensation catalyst.

9. The method of preserving a rubber which comprises treating a rubber with a product obtained by associating indene and diphenylamine and effecting a reaction between the indene and said amine by heating in the presence of a condensation catalyst.

10. The vulcanized rubber product obtained by heating a rubber and sulfur in the presence of a product obtained by reacting indene and a secondary diarylamine in which only secondary amino groups are present in the presence of a condensation catalyst.

11. The vulcanized rubber product obtained by heating a rubber and sulfur in the presence of a product obtained by heating indene and a secondary diarylamine in which only secondary amino groups are present in the presence of a condensation catalyst.

12. The vulcanized rubber product obtained by heating india rubber and sulfur in the presence of a product obtained by reacting indene and a secondary diarylamine in which only secondary amino groups are present and wherein a secondary nitrogen atom is linked directly to two different carbon atoms each of which is part of an aromatic ring in the presence of a condensation catalyst.

13. The vulcanized rubber product obtained by heating a rubber and sulfur in the presence of a product obtained by associating indene and a secondary diarylamine in which only secondary amino groups are present and wherein a secondary nitrogen atom is linked directly to two different carbon atoms each of which is part of an aromatic ring, and effecting a reaction between the indene and said amine by heating in the presence of a condensation catalyst.

14. The vulcanized rubber product obtained by heating a rubber and sulfur in the presence of a product obtained by reacting indene and a secondary diarylamine in which only secondary amino groups are present and wherein the aryl groups are chosen from the benzene and naphthalene series in the presence of a condensation catalyst.

15. The vulcanized rubber product obtained by heating a rubber and sulfur in the presence of a product obtained by heating indene and a secondary diarylamine in which only secondary amino groups are present and wherein the aryl groups are chosen from the benzene and naphthalene series in the presence of a condensation catalyst.

16. The vulcanized rubber product obtained by heating a rubber and sulfur in the presence of a product obtained by associating indene and a secondary diarylamine in which only secondary amino groups are present and wherein a secondary nitrogen atom is linked directly to two different carbon atoms each of which is a member of an aryl group chosen from the benzene and naphthalene series, and effecting a reaction between the indene and said amine by heating in the presence of a condensation catalyst.

17. The vulcanized rubber product obtained by heating a rubber and sulfur in the presence of a product obtained by associating indene and diphenyl amine and effecting a reaction between the indene and said amine by heating in the presence of a condensation catalyst.

DAVID CRAIG.